United States Patent Office 3,065,273
Patented Nov. 20, 1962

3,065,273
METHOD FOR PREPARING BIPHOSPHINES
Norman A. Meinhardt, Cleveland, Ohio, assignor to The Lubrizol Corporation, Wickliffe, Ohio, a corporation of Ohio
No Drawing. Filed Feb. 28, 1961, Ser. No. 92,130
12 Claims. (Cl. 260—606.5)

This invention relates to biphosphines and also to a process for preparing the same. More particularly this invention relates to aryl-biphosphines and the oxides and sulfides of such biphosphines.

Biphosphines have not been widely known in the art because of the difficulty of their preparation. The commonly employed method for preparing biphosphines involves the reaction of an organic halophosphine with metallic sodium usually suspended in a solvent such as diethyl ether. A principal difficulty in carrying out the reaction is associated with the immiscibility of sodium with the organic halophosphine. Hence, the reaction takes place in a heterogeneous medium and the formation of biphosphine products depends largely upon adequate contact between sodium and the halophosphine. In this situation efficient but costly means of agitation is usually required. Also, as a result of the heterogeneity of the medium, the reaction requires a high temperature and a long completion period. These conditions, unfortunately, are also conducive to secondary reactions of sodium with the bisphosphine product.

Attempts to form biphosphine oxides or sulfides by a similar reaction of a sodium suspension with a phosphinic halide or phosphinothioic halide have not been successful. In such reaction sodium reacts with the halide to give a phosphinyl sodium intermediate which immediately forms a coating on the surface of the suspended sodium, thereby preventing further reaction.

Accordingly it is an object of this invention to provide a process for preparing biphosphines and derivatives of biphosphines.

It is also an object of this invention to provide a process for preparing aryl-biphosphines and the oxides and sulfides of such biphosphines.

These and other objects are attained in accordance with this invention by providing a process for preparing biphosphines which comprises the reaction of a diarylphosphinyl halide having the structural formula

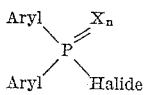

wherein X is selected from the class consisting of oxygen and sulfur and $n$ is selected from the class consisting of 1 and zero, with sodium naphthalenide in an ethereal solvent.

The reaction of the above process is represented by the following equation:

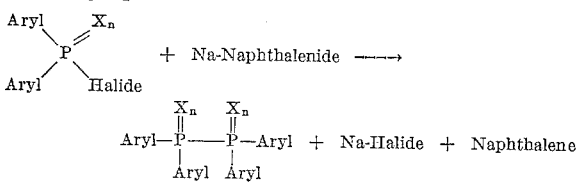

The diarylphosphinyl halides useful in the process include diarylphosphino halides, diarylphosphinic halides, and diarylphosphinothioic halides. The aryl radicals of the diarylphosphinyl halides include principally phenyl and naphthyl radicals. They include also the halo-substituted and the hydrocarbon-substituted phenyl and naphthyl radicals wherein the hydrocarbon substituents is exemplified by alkyl, cycloalkyl, or aryl radicals. Specific examples of the diarylphosphinyl halides are diphenylphosphino chloride, di(chlorophenyl)phosphino chloride, di(bromo phenyl) phosphino chloride, dinaphthylphosphino chloride, diphenylphosphino bromide, diphenylphosphino iodide, di-p-tolylphosphino chloride, phenyl naphthyl phosphino chloride, di-n-dodecylphenyl phosphino cloride, di-xenyl phosphino chloride, and o-cyclohexylphenyl p-octylphenylphosphino chloride, and the oxides (i.e., phosphinic halides), and the sulfides (i.e., phosphinothioic halides) of the phosphino halides illustrated hereinabove. The diarylphosphinyl chlorides are most readily available and are preferred for use in the process of this invention.

Methods for preparing diarylphosphinyl halides are known in the art. A convenient method for preparing diarylphosphino halides comprises the reaction of an aryl hydrocarbon with a phosphorus trihalide such as phosphorus trichloride in the presence of a Friedel-Crafts catalyst such as aluminum chloride. Another method involves the reaction of a phosphorus trihalide with a metallo-hydrocarbon compound such as diaryl-mercury. Diarylphosphinic or diarylphosphinothioic halides are obtained by the reaction of an aryl hydrocarbon with phosphorus oxychloride or phosphorus thiobromide in the presence of a Friedel-Crafts catalyst.

Sodium naphthalenide is formed by the reaction of metallic sodium with naphthalene in equi-molar proportions in an ethereal solvent. A critical aspect in the formation of sodium naphthalenide is the use of an ether as a solvent in an amount sufficient to result in a homogeneous mixture, i.e., to obtain an ethereal solution of sodium naphthalenide. Without a solvent, no reaction between sodium and naphthalene apparently takes place and a mere heterogeneous mixture is obtained.

Ethers useful as the solvent in the above process are for the most part aliphatic and cycloaliphatic ethers. They are preferably saturated ethers having from 2 to about 20 aliphatic carbon atoms such as dimethyl ether, diethyl ether, diisopropyl ether, di-n-butyl ether, methyl octyl ether, 1,2-dimethoxy-ethane, 1,2-diethoxy-ethane, 1,3-diethoxy-propane, tetrahydrofuran, 2-methyl-trihydrofuran, or tetrahydropyran. Of these tetrahydrofuran, dioxane, tetrahydropyran, 1,2-dimethoxy-ethane, and 1,2-diethoxy-ethane have been found to be especially useful.

The concentration of sodium naphthalenide in the ethereal solvent is not critical. For practical considerations, solutions containing from about 5% to about 50% of sodium naphthalenide are preferred. The reaction of the herein described process can be carried out simply by mixing the diarylphosphinyl halide with an ethereal solution of sodium naphthalenide at a temperature below the decomposition point of the components of the reaction mixture. Sodium chloride is formed as a by-product and can be removed by filtration. The biphosphine product then is recovered from the reaction mixture by extraction, precipitation, filtration, or any such known technique. The preferred temperature for the reaction is within the range from about 10° C. to about −70° C., particularly from about −10° C. to about −50° C. A higher temperature such as room temperature or even higher may likewise be used.

The following examples are illustrative of the process of this invention:

Example 1

Sodium naphthalenide is prepared by mixing at room temperature 11.5 grams (0.5 mole) of sodium with 64 grams (0.5 mole) of naphthalene in 500 cc. of tetrahydrofuran. The resulting solution is cooled to −30° C. and to this solution there is added dropwise 126 grams (0.5 mole) of diphenylphosphinothioic chloride within a period of 2 hours. Thereafter the mixture is kept at room temperature for 15 hours and then heated to 70° C./10 mm. to remove tetrahydrofuran. The residue is dissolved in a mixture of 300 cc. of ethyl alcohol and 50 cc. of benzene and the solution is filtered to remove sodium chloride. The filtrate is heated first to remove ethyl alcohol and benzene and then to 100° C./0.15 mm. to remove naphthalene by sublimation. The residue is recrystallized from a mixture of ethyl alcohol and benzene (weight ratio of 6:1, respectively) to give tetraphenyl biphosphine disulfide having a melting point of 168°–171° C., a phosphorus content of 14.1%, and a sulfur content of 14.2%.

*Example 2*

The process of Example 1 is repeated except that diphenylphosphinic chloride (118 grams, 0.5 mole) is used in lieu of the diphenylphosphinylthioic chloride. The product obtained is tetraphenyl biphosphine dioxide having a melting point of 168°–171° C. and a phosphorus content of 15.1%.

*Example 3*

The process of Example 1 is repeated except that dimethoxy ethane is used in lieu of tetrahydrofuran as the solvent.

*Example 4*

The process of Example 1 is repeated except that the temperature at which the reaction of the phosphinothioic chloride with sodium napthalenide is carried out is 0° C.

*Example 5*

The process of Example 1 is repeated except that diphenylphosphino chloride (102 grams, 0.5 mole) is used in lieu of the diphenylphosphinylthioic chloride.

*Example 6*

The process of Example 1 is repeated except that di-(n-butylphenyl)phosphinothioic chloride (0.5 mole) is used in lieu of the diphenylphosphinothioic chloride.

*Example 7*

The process of Example 1 is repeated except that dinaphthylphosphinic chloride (0.5 mole) is used in lieu of the diphenylphosphinothioic chloride.

*Example 8*

The process of Example 1 is repeated except that naphthyl p-decylphenylphosphinic chloride (0.5 mole) is used in lieu of the diphenylphosphinylthioic chloride.

*Example 9*

The process of Example 1 is repeated except that di(chlorophenyl)phosphinic chloride (0.5 mole) is used in lieu of the diphenylphosphinothioic chloride.

The biphosphines and derivatives of biphosphines prepared by the process of this invention are useful for a variety of purposes. They are useful for example as insecticides, intermediates for the preparation of other useful phosphorus-containing compositions, additives in lubricating compositions, and additives in gasoline. A specific illustration of the utility of such biphosphines is an insecticidal composition which comprises a kerosene solution containing 1% by weight of the product prepared by the process of Example 6. When applied to vegetation such as pines the composition is effective for controlling infestation of red spider mites.

What is claimed is:

1. A process for preparing biphosphines comprising the reaction of a diarylphosphinyl halide having the structural formula

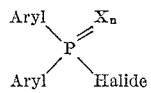

wherein X is selected from the class consisting of oxygen and sulfur and *n* a number from zero to 1, with sodium naphthalenide in an ethereal solvent.

2. The process of claim 1 characterized further in that the diarylphosphinyl halide is a diarylphosphino chloride.

3. The process of claim 1 characterized further in that the diarylphosphinyl halide is a diarylphosphinothioic chloride.

4. The process of claim 1 characterized further in that the diarylphosphinyl halide is a diarylphosphinic chloride.

5. The process of claim 1 characterized further in that the diarylphosphinyl halide is a diphenylphosphinyl halide.

6. The process of claim 1 characterized further in that the diarylphosphinyl halide is diphenylphosphinothioic chloride.

7. The process of claim 1 characterized further in that the diarylphosphinyl halide is diphenylphosphinic chloride.

8. The process of claim 1 characterized further in that the ethereal solvent is a dialkoxy alkane.

9. The process of claim 1 characterized further in that the ethereal solvent is dimethoxy ethane.

10. The process of claim 1 characterized further in that the ethereal solvent is tetrahydrofuran.

11. The process of claim 1 characterized further in that the reaction is carried out at a temperature between about 10° C. and about −70° C.

12. The process of claim 1 characterized further in that the reaction is carried out at a temperature between about −10° C. and about −50° C.

No references cited.